Patented Dec. 3, 1940

2,223,517

UNITED STATES PATENT OFFICE 2,223,517

PREPARATION OF 4-CHLOR-4'-DIETHYL-AMINO BENZOPHENONE

Philip D. Hammond, Metuchen, and Robert W. Harris, Woodbridge Township, Middlesex County, N. J., assignors to Heyden Chemical Corporation, New York, N. Y., a corporation of New York No Drawing. Application December 22, 1939, Serial No. 310,608

1 Claim. (Cl. 260—570)

This invention involves a new method of making 4-chlor 4'-diethylamino benzophenone having the formula

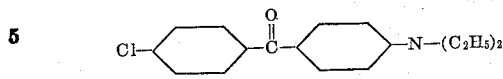

It has heretofore been proposed to make this compound by reaction of diethyl aniline with the anilide of para chlor benzoic acid in the presence of phosphorous oxy chloride, but this method is tedious, corrosive, and gives poor yields.

It has also been proposed to make it by the action of aluminum chloride on chlorbenzol and para diethylamino benzoyl chloride, the latter compound being obtainable only in poor yield through phosgenation of diethyl aniline.

Still another method which has been proposed involves the ethylation of 4-chlor 4' amino benzophenone, which latter product is expensive and not readily available on the market.

We have discovered a process by which the 4-chlor 4'-diethyl amino benzophenone may be produced through the action of aqueous diethylamine upon the corresponding dichlor benzophenone in the presence of a copper catalyst. As an example of our method one may proceed as follows:

| | Grams |
|---|---|
| 4.4' dichlor benzophenone | 200 |
| Cuprous and cupric chlorides | 5 |
| Water | 800 |
| Diethylamine | 500 | are placed in an autoclave which is closed and heated to about 230° C. for a period of about 24 hours, under the corresponding autogenic superatmospheric pressure.

The autoclave is cooled, and the supernatant diethylamine layer decanted from the product in solid or semi-solid condition. The product is dissolved in dilute hydrochloric acid, filtered to remove insolubles, and neutralized with dilute alkali. It is again allowed to cool and the solids are filtered and dried. When the resulting product is recrystallized from methanol there is obtained a 4-chlor 4'-diethylamino benzophenone melting at about 104° C.

Although in the example given both cuprous and cupric chlorides are employed, the desired reaction may be obtained using either cuprous or cupric chloride alone, or by using metallic copper or any copper compound commonly employed in the art for effecting catalysis of analogous compounds.

Although certain specific proportions of the dichlor benzophenone and the diethylamine are given, it is important to note that regardless of the ratio of these two ingredients or any increase in reaction time or in temperatures between 180° C. and 250° C., the 4-chlor 4'-diethylamino benzophenone is produced and may be isolated from the reaction products.

In the example given the ratio of diethylamine to dichlor benzophenone is about twice that required by theoretical considerations, even for the replacement of both halogens, but in spite of this large proportion of diethylamine only one of the halogens is replaced by the diethylamino group.

The reaction is not that which might be expected, because when dichlor benzophenone is treated in a similar manner with dimethylamine, both of the halogens are replaced by dimethylamino groups, as is set forth in our prior copending application Serial No. 270,510, filed April 28, 1939.

Having thus described our invention, what we claim as new and desire to secure by Letters Patent is:

The process for the production of 4-chlor 4'-diethylamino benzophenone, which comprises reacting aqueous diethylamine solution with 4,4' dichlor benzophenone in the presence of a copper catalyst at a temperature of 180° C. to 250° C. at the corresponding autogenic superatmospheric pressure.

PHILIP D. HAMMOND.
ROBERT W. HARRIS.